United States Patent [19]

Grimes et al.

[11] Patent Number: 5,287,211
[45] Date of Patent: Feb. 15, 1994

[54] MULTIPATH OPTICAL TRANSMISSION SYSTEM CONTROLLER

[75] Inventors: Gary J. Grimes, Thornton; John C. Moran, Broomfield, both of Colo.

[73] Assignee: AT&T Bell Laboratories, Murray Hill, N.J.

[21] Appl. No.: 800,672

[22] Filed: Nov. 27, 1991

[51] Int. Cl.⁵ .......................................... H04B 10/12
[52] U.S. Cl. ................................ 359/161; 359/110; 359/158; 359/173; 356/73.1
[58] Field of Search ............... 359/110, 124, 135, 138, 359/143, 140, 153, 158, 154, 161, 173, 187, 194; 356/72, 73.1; 370/14, 15, 17; 375/109; 455/69, 70; 379/2, 4

[56] References Cited

U.S. PATENT DOCUMENTS

| | | | |
|---|---|---|---|
| 4,947,459 | 8/1990 | Nelson | 359/161 |
| 4,994,675 | 2/1991 | Levin | 359/110 |
| 5,046,807 | 10/1991 | Unitt | 359/113 |
| 5,066,139 | 11/1991 | Soderberg | 370/15 |
| 5,099,349 | 3/1992 | Yoshida | 359/161 |

Primary Examiner—Leslie Pascal
Attorney, Agent, or Firm—John C. Moran

[57] ABSTRACT

Utilization of an electrical link separate from an optical transmission path to gather information identifying the number and types of optical devices in the optical path and utilization of this information to adjust the power output level of an optical transmitter and to transmit the power output level to optical receivers connected to the optical transmitter by the optical path. Each optical receiver is responsive to the number and types of optical components in the path between the optical receiver and the optical transmitter and the power output level to adjust the sensitivity of the optical receiver. Each optical component is associated with an electrical identification circuit connected to the electrical link which specifies the information on the electrical link concerning the optical component including the performance characteristics of the optical component.

17 Claims, 9 Drawing Sheets

FIG. 11

MULTIPATH OPTICAL TRANSMISSION SYSTEM CONTROLLER

TECHNICAL FIELD

This invention relates to optical transmission systems, and, in particular, to controlling the output power of optical transmitters and sensitivity of optical receivers in a multipath optical transmission system.

BACKGROUND OF THE INVENTION

The capability of being able to adjust the output power of an optical transmitter in response to changing conditions within a transmission system and to transfer that output power information to each optical receiver is very important in large optical transmission systems. One such optical system is commonly called the fiber-in-the-loop (FITL) system which will provide optical fiber connections to residential homes. In such systems, there are a large number of optical components in various optical paths, and it is a difficult problem to maintain records which specify the number and type of optical components in each optical path. The number and type of optical components is particularly important in optical transmission systems since attenuation is introduced into the optical transmission path by the optical fibers, splices, connectors, splitters, combiners, etc. The present residential telephone systems illustrate the problems of maintaining accurate records of installed equipment and cables in the residential environment.

One prior art method for correcting this type of situation with respect to the output power level is to manually adjust the optical transmitter and optical receivers by physically adjusting the transmitters and receivers or by entering information into a computer controlling the transmission system and having the computer adjust each individual receiver and transmitter. The problems with a manual adjustment procedure are expense and probability of human errors.

In another prior art method, U.S. Pat. No. 5,060,302 discloses an optical receiver feeding back information to an optical transmitter to adjust the output of the optical transmitter. There are two problems with this prior art solution. First, it only functions where a transmitter is driving a single receiver, and second, it requires an additional optical transmitter and receiver for the feedback path which is expensive. In addition, no provision is made for the adjustment of the optical receiver.

Another prior art method which does not require manual entry of data is disclosed in U.S. Pat. No. 4,295,043. This patent discloses the use of a connector which identifies the length of attached cable by predefined electrical contacts placed on the connector of the cable. Different connectors are used for different lengths of optical fiber when the cable is being assembled. The receiver then automatically adjusts to the cable length based on the electrical contacts and assumes a predefined transmitter output. This method does allow a receiver to adjust for particular lengths of optical fiber in a given transmitter output. However, it does not allow two lengths of optical fiber cable to interconnect the transmitter and receiver. Nor does the method allow for multiple optical receivers to be connected to one optical transmitter.

There exists a need for a method which determines the optimal power output from an optical transmitter on the basis of optical components in the various paths connecting optical receivers to the optical transmitter and which communicates the output of the optical transmitter to each individual optical receiver so that each optical receiver can adjust its sensitivity to match the output of the optical transmitter.

In systems using duplicated optical transmission subsystems, an active one of two optical transmitters transmits to a plurality of receivers. If it becomes necessary for the inactive one of the optical transmitters to become active, the optical receivers must adjust to the difference between signal levels of the two optical transmitters when the optical paths from the optical transmitters to the optical receivers having different attenuations. The time required for the optical receivers to adjust causes data to be lost which can not be tolerated in some systems.

There exist a need for for a method which will allow an inactive optical transmitter to start transmitting to optical receivers without the optical receivers having to adjust for a difference in signal levels.

SUMMARY OF THE INVENTION

The foregoing problems are solved by an apparatus and method that utilize a physical link separate from an optical transmission path to gather information identifying the number and types of optical devices in the optical path and utilize this information to adjust the power output level of an optical transmitter and to transmit the power output level to optical receivers. Each optical receiver is responsive to the number and types of optical components in the path between the optical receiver and the optical transmitter and the power output level to adjust the sensitivity of the optical receiver. The alternate physical link is an electrical link and associated with each optical component is an electrical identification circuit connected to the electrical link which specifies information concerning the optical component including the performance characteristics of the optical component.

To obtain the performance information, an electrical signal unit located with the optical transmitter transmits a start packet; and each identification circuit is responsive to the start packet to insert the characteristics of the corresponding optical component into the packet. A microcomputer located with an individual optical receiver is responsive to the start packet to store the characteristics of the optical components and to transmit these characteristics back to the signal unit in an acknowledge packet. The signal unit is responsive to the acknowledge packet to calculate the required output power of the optical transmitter, to adjust the optical transmitter, and to communicate the output power level to the optical receivers via a power packet. Each microcomputer is responsive to the power packet and stored characteristics to adjust the optical receiver located with the microcomputer.

Further, the method and apparatus is used to adjust a plurality of optical transmitters and a plurality of optical receivers interconnected via different optical paths to the optical transmitters. One transmitter at a time (active transmitter) transmits to all of the optical receivers. The optical receivers and transmitters are adjusted such that it is not necessary to readjust the optical receivers when a different optical transmitter becomes the active transmitter and starts to transmit to the optical receivers. Further, the optical receivers and transmitters are adjusted such that no data errors occur when a different transmitter becomes active and starts to transmit. Signal units, each corresponding to an individual optical transmitter, obtain the characteristics of the optical components in the optical paths interconnecting each optical transmitter to the optical receivers as previously described for single optical transmitter. A system computer which is connected to the signal units uses the characteristics to determine the power output level of each optical transmitter and the sensitivity adjustment of each optical receiver. The system computer transfers to the power output level of a optical transmitter to the signal unit corresponding to that optical transmitter. Each signal unit adjusts its corresponding optical transmitter. The system computer communicates the sensitivity adjustment for each optical receiver to the optical receivers via the signal unit of the active optical transmitter.

Other and further aspects of the present invention will become apparent in the course of the following description and by reference to the accompanying drawing.

DETAILED DESCRIPTION

Figure 1:
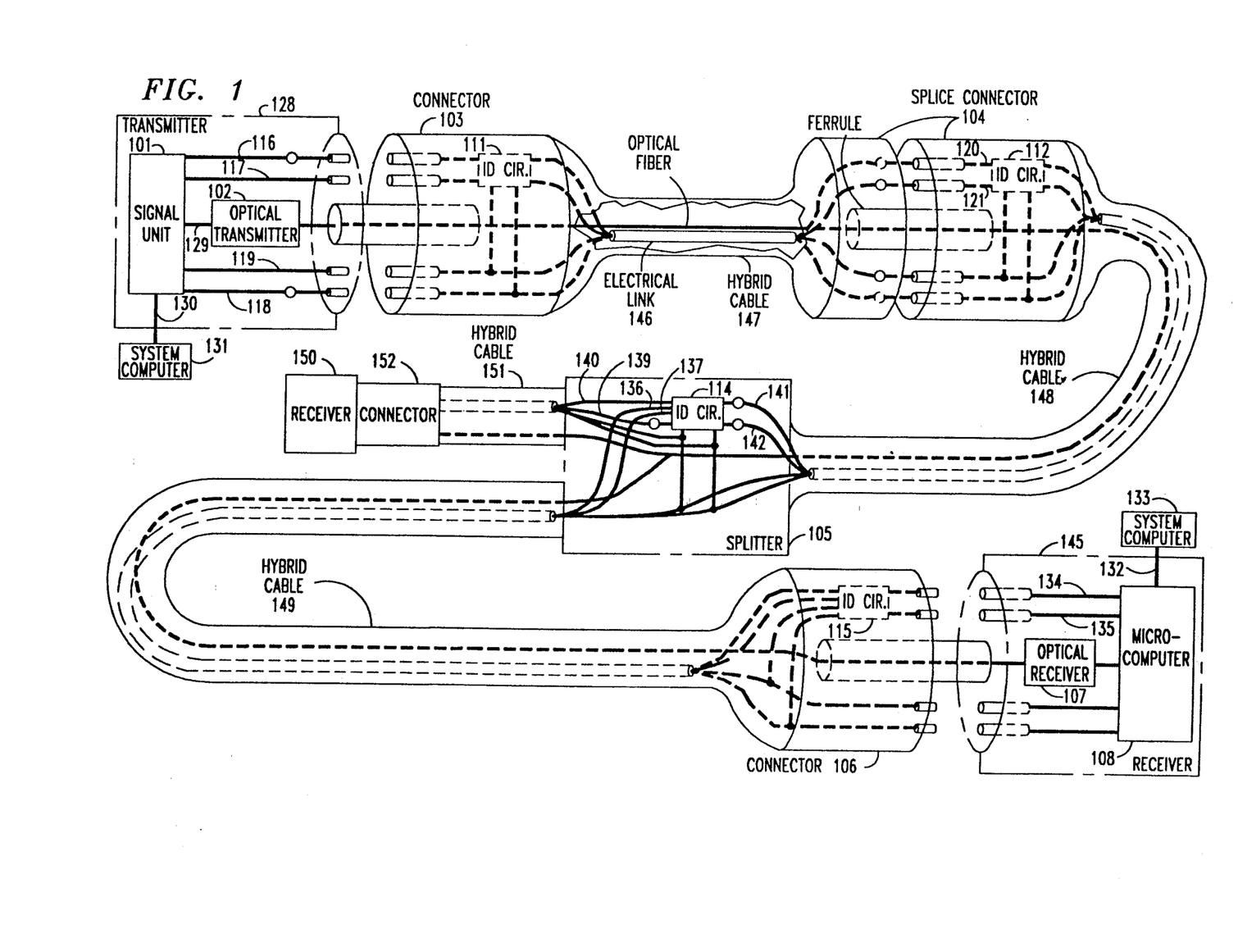
FIG. 1 illustrates an embodiment in accordance with the invention.
Figure 2:
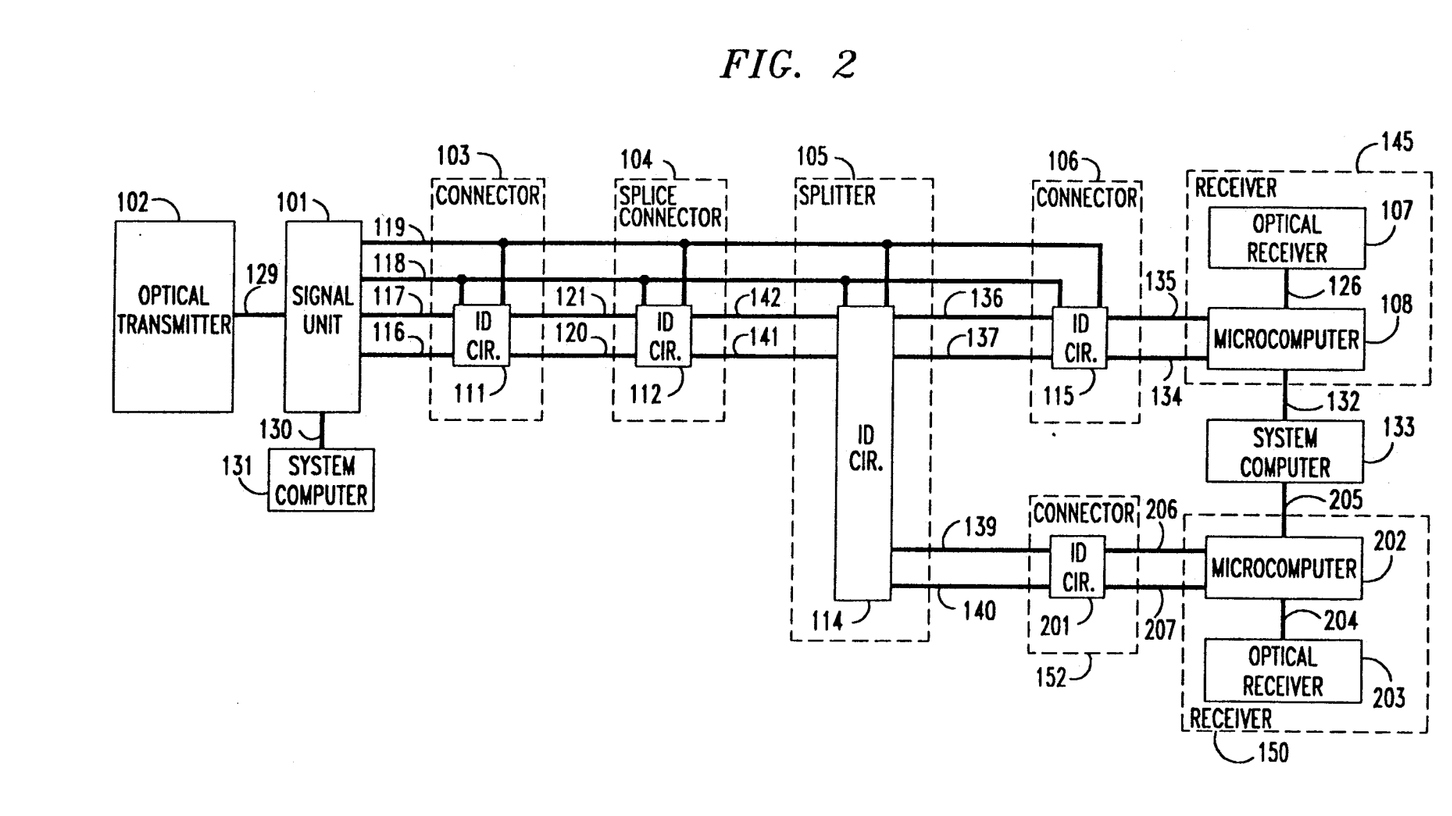
FIG. 2 illustrates the electrical schematic of the embodiment illustrated in FIG. 1.

FIG. 1 illustrates a pictorial representation of one embodiment of an optical transmission system in accordance with the invention. As illustrated in FIG. 1, transmitter 128 is interconnected to receiver 145 by connector 103, hybrid cable 147, connector 104, hybrid cable 148, splitter 105, hybrid cable 149, and connector 106. In addition, transmitter 128 is interconnected to receiver 150 by the same route as receiver 145 up to and including splitter 105; after that, the connection is via hybrid cable 151 and connector 152. The interconnection between transmitter 128 and receivers 145 and 150 includes both an electrical path and an optical path as illustrated in FIG. 1. Each optical component has a corresponding identification circuit interconnected to the electrical path. The electrical schematic of the electrical path illustrated in FIG. 1 is shown in FIG. 2. Receiver 150 is shown in greater detail in FIG. 2. Each identification circuit stores characteristics of the corresponding optical device. Signal unit 101 obtains these characteristics by first transmitting a start packet on conductor 117. The start packet is sent in a standard format utilizing self clocking data on conductor 116 such as a return to zero Manchester encoding protocol format. Identification circuit 111 is responsive to the start packet to insert the characteristics and identity of connector 103 into the start packet and to transmit the start packet to identification circuit 112 via conductor 120. Identification circuit 112 performs operations similar to those of identification circuit 111 and transmits the packet to identification circuit 114 via conductor 142.

Identification circuit 114 inserts information into the start packet the identity of splitter 105 and optical characteristics which are peculiar to the optical path to hybrid cable 149 and peculiar to the optical path to hybrid cable 151. Identification circuit 114 then transmits the start packet to both identification circuit 201 and identification circuit 115 via conductors 139 and 136, respectively. Identification circuits 201 and 115 are responsive to their respective packets to include the identity and characteristics of connectors 152 and 106, respectively. After updating the packets, identification circuits 201 and 115 each transfer a start packet to their attached microcomputers.

Microcomputer 108 is responsive to the start packet received from identification circuit 115 via conductor 134 to store the information in the start packet containing characteristics and identity of connectors in the optical path from receiver 145 to transmitter 128. After storing that information, microcomputer 108 forms an acknowledge which comprises that information and transmits the acknowledge packet on conductor 135 to identification circuit 115. Identification circuit 115 relays the acknowledge packet received from microcomputer 108 to identification circuit 114 of splitter 105 via conductor 136. Microcomputer 202 performs similar functions with respect to the packet received from identification circuit 201 and retransmits the received packet back to identification circuit 114 via identification circuit 201 and conductors 206 and 139. Identification circuit 114 waits until both acknowledge packets are received from microcomputer 108 and microcomputer 202. After receiving both packets, identification circuit 114 assembles a new packet which contains the information from the two received packets but also includes information identifying from which optical connection in splitter 105 the information was received. After assembling a new acknowledge packet, identification circuit 114 transfers this packet back to signal unit 101 via identification circuits 112 and 111.

Signal unit 101 is responsive to the acknowledge packet to determine from the characteristics of optical components of each path what minimum output is required from optical transmitter 102 to be able to transfer information to optical receivers 203 and 107. These optical receivers could be interconnected to optical transmitter 102 through a different number of optical components or different lengths of optical fiber and require different power levels from optical transmitter 102.

Once unit 101 has determined the required power output for optical transmitter 102, unit 101 adjusts the power level of optical transmitter 102 via conductor 129 and transmits back to the optical receivers a power packet which defines the power output of optical transmitter 102. The power packet is transferred to microcomputer 202 via identification circuits 111, 112, 114, and 201, and the power packet is transferred to microcomputer 108 via identification circuits 111, 112, 114, and 115. Microcomputer 108 is responsive to the transmitter's power level defined in the power packet and the information previously stored giving the characteristics of the optical components to determine to what level the sensitivity that optical receiver 107 needs to be adjusted. Microcomputer 202 performs a similar operation with respect to optical receiver 203.

The transmission from signal unit 101 to the microcomputers is performed by using well known self-clocking techniques such as the Manchester encoding protocol. Similarly, the conductors communicating information from the microcomputers to signal unit 101 (e.g., 134) also use the same protocol. A safety problem exists when lasers are utilized to drive optical fibers since a laser may be dangerous to human eyes. To prevent injury, it is necessary to inhibit optical transmitter, if any of the hybrid cables between transmitter 128 and receivers 145 and 150 become disconnected or cut. In accordance with the invention, the system illustrated in FIG. 2 overcomes this problem using the following method. In the return path which for microcomputer 108 comprises conductors 134, 137, 141, 120, and 116, each identification circuit continuously transmits zeros on this return path if the identification circuit is receiving zeros as an input on the return path when a packet is not being transmitted on the return path. To accomplish this from the point of view of microcomputer 108, microcomputer 108 transmits all zeros during the idle time to identification circuit 115. Consequently, identification circuit 115 transmits all zeros to identification circuit 114 which is in splitter 105 upon receiving all zeros from microcomputer 108. Identification circuit 114 only transmits continuous zeros during the idle state, when it is receiving continuous zeros from identification circuits 115 and 101.

Immediately upon detecting that the identification circuit is not receiving either a packet or all zeros, each identification circuit stops transmitting packet data or all zeros. The result is that should a break occur within the hybrid cables interconnecting transmitter 128 to receivers 145 and 150, signal unit 101 is informed of this event very quickly. Once signal unit 101 is aware that one of the receivers is not connected, signal unit 101 inhibits optical transmitter 102 from transmitting data. This method allows the fact that a break has occurred in one of the hybrid cables to very rapidly be communicated to signal unit 101 so that it can inhibit optical transmitter 102. The identification circuits differentiate between the idle state and the packet state on the basis of the start and end flags in packets.

Figure 4:
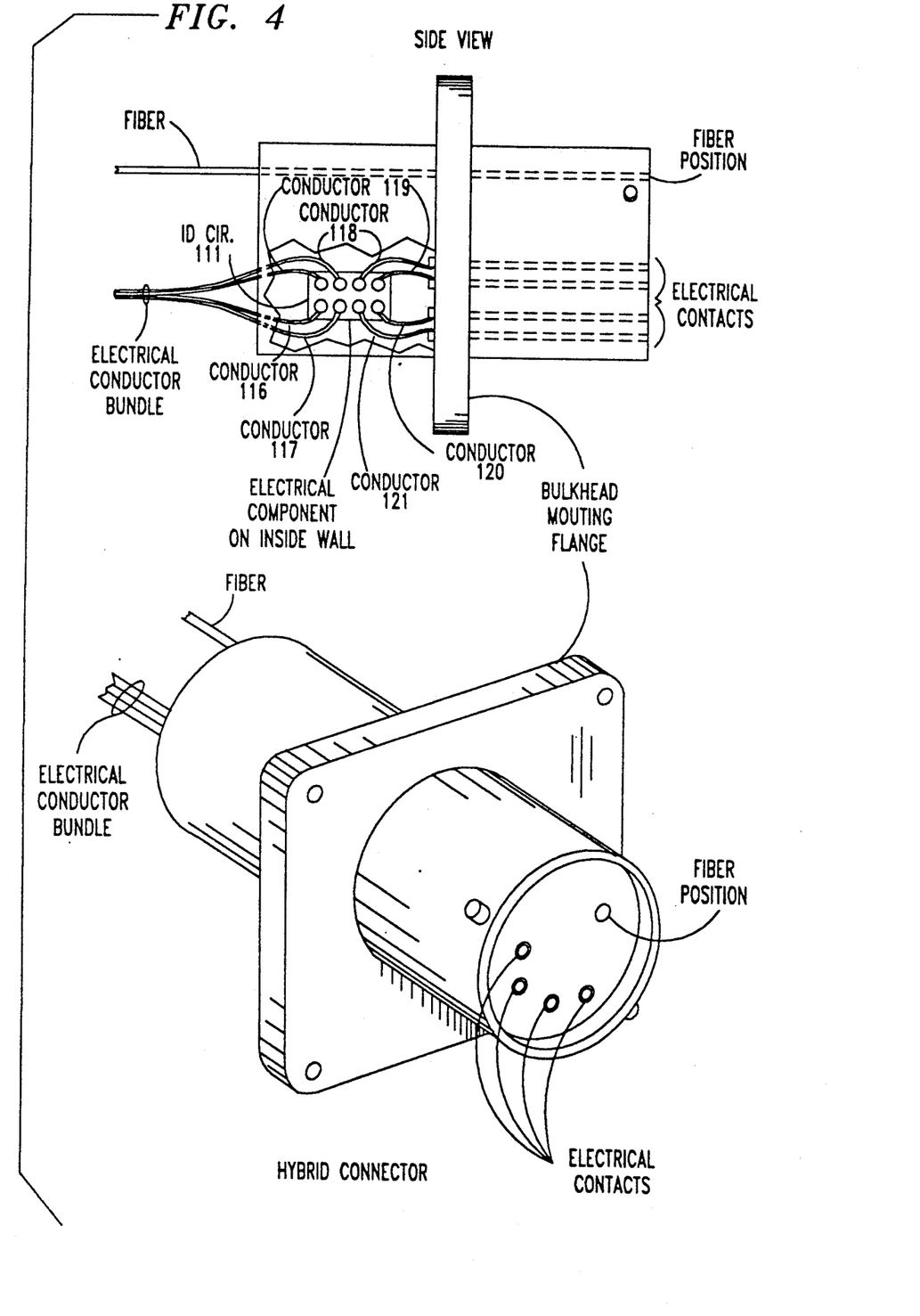
FIG. 4 illustrates an electrical and optical connector for utilization with the embodiment illustrated in FIG. 1.

FIG. 4 illustrates, in detail, a connector suitable for use as connector 104 of FIG. 1. The other connectors would have a similar mechanical arrangement.

Figure 3:
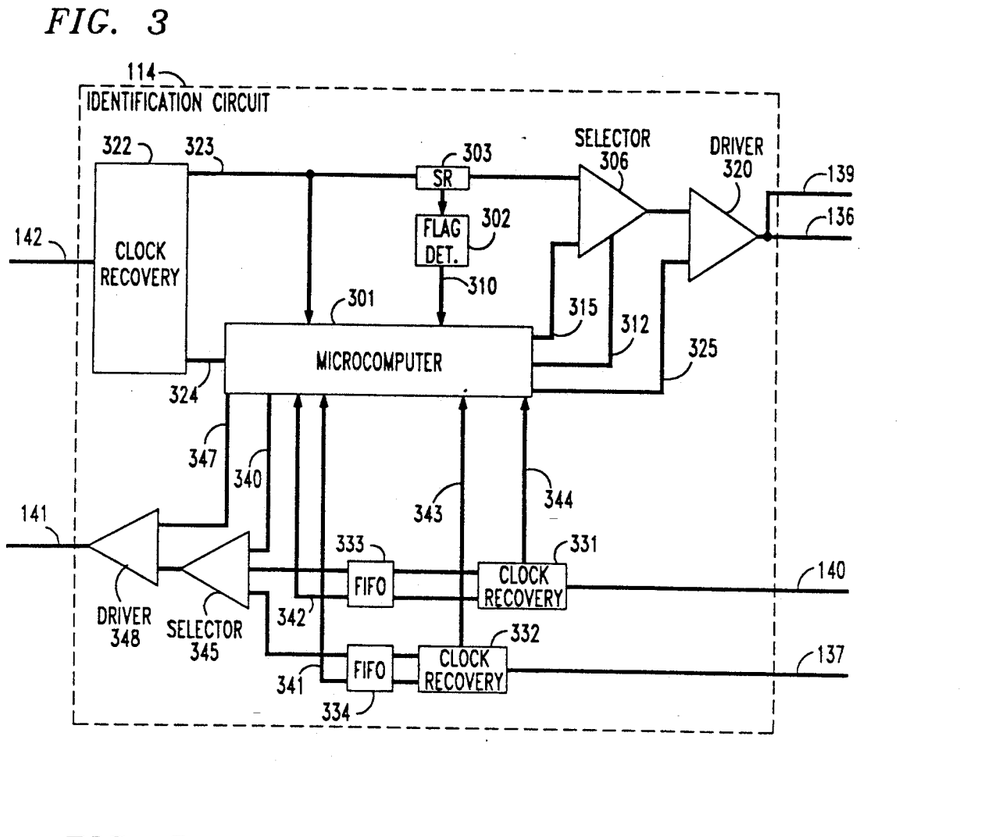
FIG. 3 illustrates, in block diagram form, an identification circuit for use in FIG. 1.

FIG. 3 illustrates, in greater detail, identification circuit 114. First the operation of identification circuit 114 with respect to data being received on the outward path (conductor 142) will be described and then data being received on the inward paths (conductors 140 and 137) will be described. Clock recovery circuit 322 recovers the clock information and the data. The clock information is communicated to microcomputer 301 via conductor 324 and although not shown is also transferred to shift register 303. The data is transferred to microcomputer 301 and shift register 303 via conductor 323. Flag detector 502 continuously examines the contents of shift register 303 to detect the start and end flags. Once the start flag is detected, flag detector 302 transmits this information to microcomputer 301 via cable 310. Microcomputer 301 is responsive to the signal indicating a start flag to examine the header of the packet via conductor 323 to determine the type of packet that is being received. If the packet is not a start packet, microcomputer 301 performs no actions and simply lets the packet be transferred through blocks 322, 303, 306, and 320 to conductors 136 and 139. If microcomputer 301 detects a start packet, it then performs the following operations. In response to the signal from flag detector 302, transmits the identification information for splitter 105 out on conductor 315 to selector 306. Microcomputer 301 also transmits signals via bus 312 to selector 306 so that the latter selector selects the information on conductor 315. Note, that microcomputer 301 also transmits clock signals and control information to driver 320 via cable 325. Selector 306 transfers the received signals to driver 320 which combines these signals with clock signals received via cable 325 and transmits the resulting signals on conductors 136 and 139. After the identification information has been transferred to the output of driver 320, microcomputer 301 transmits the end flag through selector 306 to driver 320 for output on conductors 136 and 139.

Figure 5:
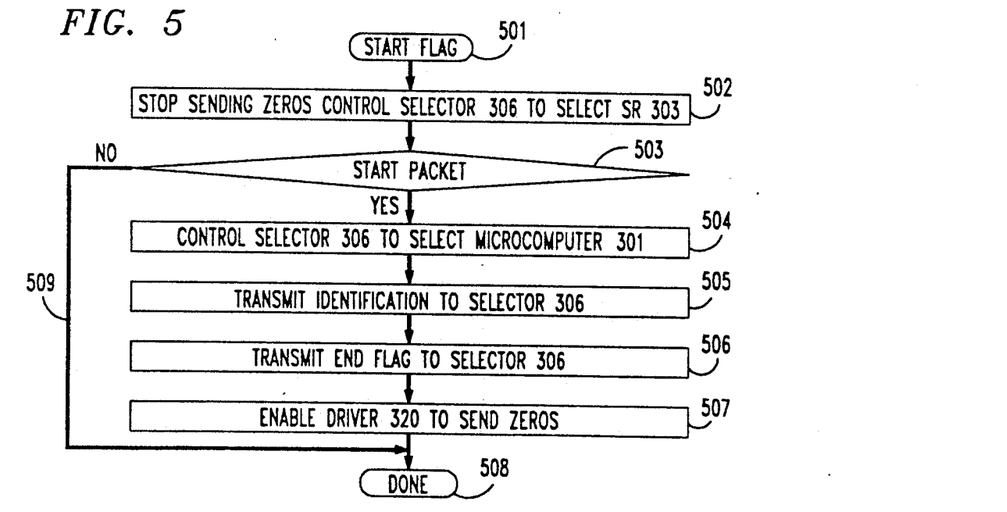
FIG. 5 illustrates, in flow chart form, the response of an identification circuit to a start packet.
Figure 6:
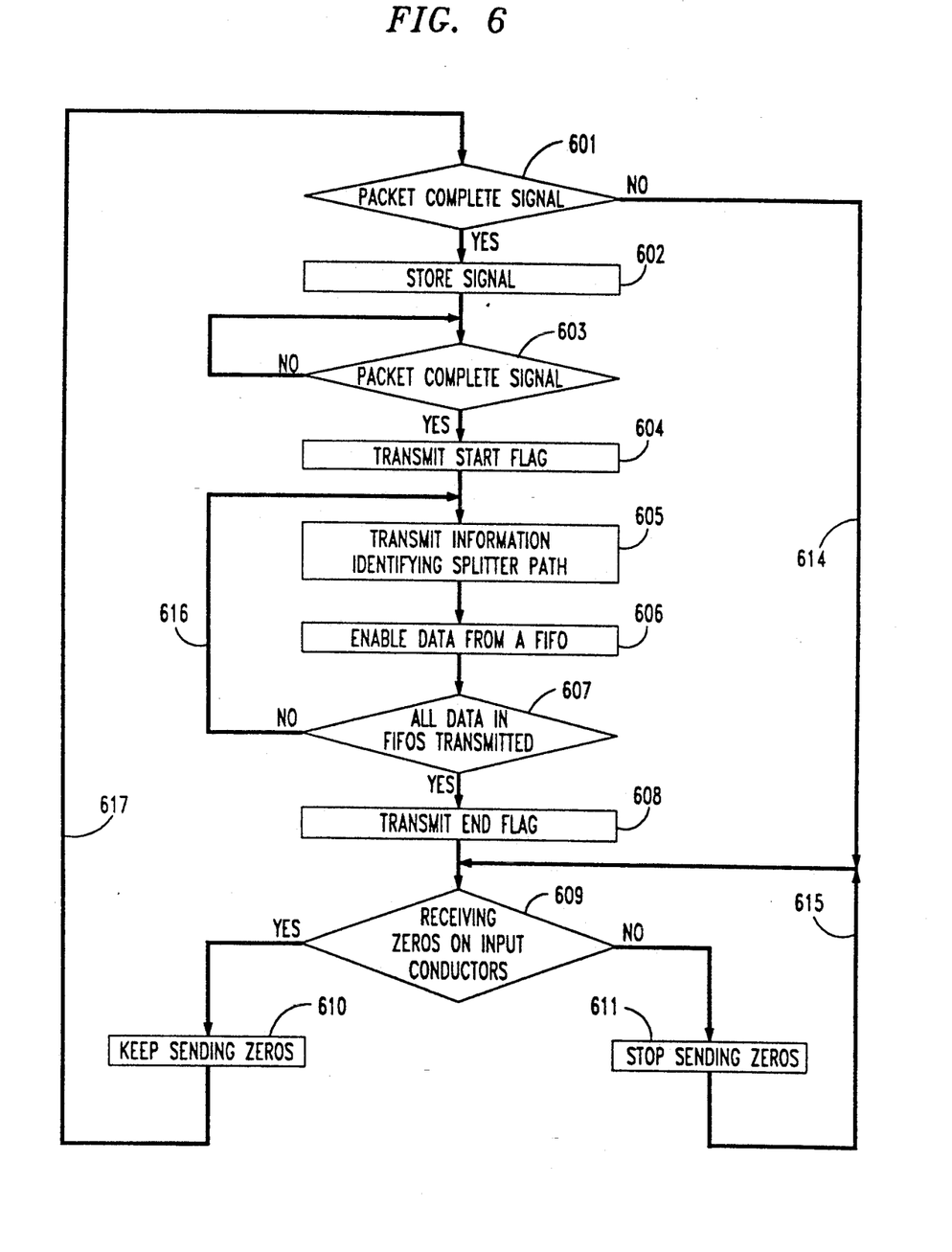
FIG. 6 illustrates, in flow chart form, the response of an identification circuit to a packet.

FIG. 5 illustrates, in flowchart form, the routine performed by microcomputer 301 in processing signals received over conductor 142 for communication to conductors 136 and 139. Note, that the routines illustrated in FIGS. 5 and 6 are performed concurrently by microcomputer 301 using well known time-sharing techniques. In addition, the routine illustrated in FIG. 5 is driven with the interrupt being initiated by receipt of the signal from flag detector 302 indicating that a start flag has been received. When driver 320 is not transmitting packet data, it continuously transmits zeros in the Manchester encoding protocol.

Consider the operations performed by identification circuit 114 in response to packets being received on conductors 137 and 140. Microcomputer 346 utilizing blocks 331 through 334, 345 and 348 is responsive to packets of data received on conductors 137 and 140 to wait until packets have been received from both input conductors and then to form a new packet which consists of the information of the two returned packets plus identification specifying which splitter path of splitter 105 each set of information was received. Consider this operation now in greater detail. Both clock recovery circuits 331 and 332 are responsive to data signals comprising a packet to strip off the start and end flag and to transfer the information in the form of data signals with clock signals to FIFOs 333 and 334. The packets may be received at different times and entered into the FIFOs consequently at different times. Microcomputer 346 awaits for a packet-complete signal on cables 341 and 342 from the FIFOs. Once microcomputer 346 has received packet-complete signals from both FIFOs, microcomputer 346 first transfers out a start flag via transmission of control and data to selector 345 via cable 340. Then, microcomputer 346 transmits out the identification of the optical branch represented by conductor 137 and causes FIFO 334 to transfer its data signals to selector 345 which microcomputer 346 has controlled to select the output of FIFO 334 via cable 340. These data signals then are combined with clock signals from conductor 347 by driver 348 and outputted as self-clocking data on conductor 141. After the information contained in FIFO 334 has been clocked out, microcomputer 346 outputs the identification of the optical input represented by conductor 140 on conductor 141 via cable 340, selector 345, and driver 348. After this identification information has been outputted, microcomputer 346 selects the data from FIFO 333 to be outputted via selector 345 and 348 to conductor 141. After the data from FIFO 333 has been communicated, microcomputer 346 transfers an end flag to conductor 141 via cable 340, selector 345, and driver 348.

Consider now in detail how the safety feature is provided by identification circuit 114 of FIG. 3. If clock recovery 331 or 332 detects that no data is being transmitted on conductor 137 and 140, these clock recovery circuits transmit signals to microcomputer 301 via conductors 334 and 343, respectively. Microcomputer 301 is responsive to a signal on either of these conductors to stop the transmission of signals by driver 348 on conductor 141. As long as clock recovery circuits 331 and 332 are receiving either packet data or all zeros, microcomputer 301 via cable 347 causes driver 348 to either put out all zeros or data from FIFO 333 or 334. The operations performed by microcomputer 301 with respect to packets being received on conductors 140 and 137 is illustrated in FIG. 6.

The software routine illustrated in FIG. 6 is a continuous loop. First decision block 601 checks whether a packet-complete signal has been received from either of the clock recovery circuits. If no packet-complete signal has been received, control is transferred to decision block 609 via path 614. Decision block 609 verifies that zeroes are still being received on conductors 137 and 140. Microcomputer 301 performs this operation by checking to see if any signals are being received on conductors 343 and 344 which would indicate that one of the input lines is no longer sending zeroes. If one of the input lines is no longer receiving zeroes, block 611 is executed and driver 348 is conditioned via conductor 347 to stop sending zeroes on conductor 141. Then control is transferred back to decision block 609 via path 615.

If zeroes are still being received on conductors 140 and 137, block 610 is executed and driver 348 is conditioned via conductor 347 to continue to send zeroes on conductor 141. Control is then transferred back to decision block 601 via path 617.

If a packet-complete signal is being received from one of the FIFOs of FIG. 3, block 602 stores that signal and decision block 603 is executed to wait until the next and last packet complete signal is received from the FIFO. Once both packet-complete signals have been received, block 604 is executed resulting in microcomputer controlling selector 345 and driver 348 to transmit a start flag on conductor 141. The microcomputer then transfers data from each of the FIFOs starting with FIFO 334. Before transmitting the contents of FIFO 334, microcomputer 301 transmits information identifying which splitter path this information was received on in splitter 105. This is done by execution of block 605. Next, microcomputer 301 enables FIFO 334 to transfer its data to selector 345 for transmission on conductor 141 by driver 348. Decision block 607 checks to see if all of the information in both FIFOs has been transmitted on conductor 141. If the data transmission is not complete, block 605 is reexecuted via path 616. If all the information has been transmitted, block 608 is executed and an end flag is transmitted by microcomputer 301 on conductor 141 via selector 345 and driver 348. Control is then passed to decision block 609 and the process will be repeated.

Figure 7:
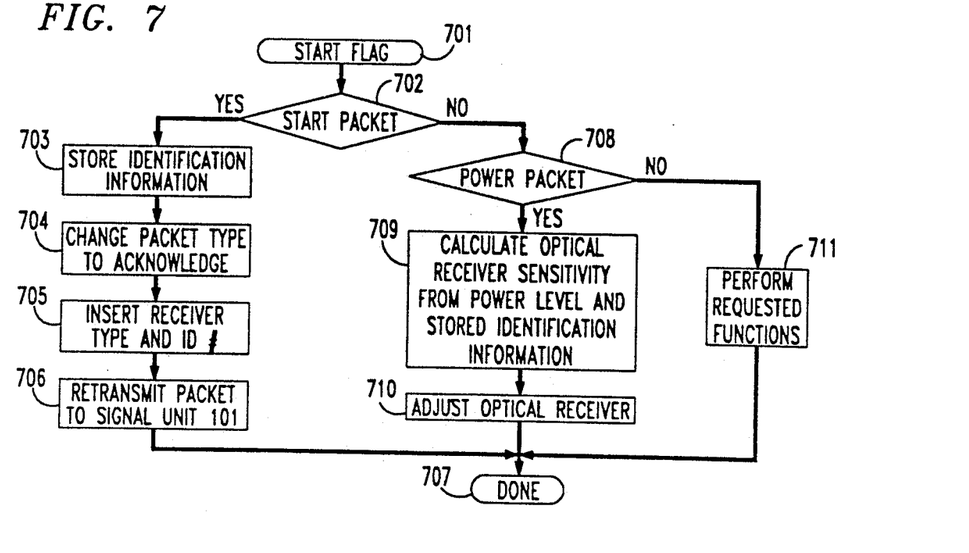
FIG. 7 illustrates, in flow chart form, the operations of an optical receiver.

FIG. 7 illustrates, in flowchart form, a program routine executed by microcomputers 202 and 108 in response to a packet being received. When a start flag is detected, entry is made at entry point 701. Decision block 702 determines whether or not the received packet is a start packet by examining the packet header. If the packet is a start packet, control is passed to block 703 which stores the optical component identification information and passes control to block 704. The latter block changes the packet type from a start packet to an acknowledge packet by changing the packet header. Block 705 inserts into the packet the receiver type and identification number, and block 706 then retransmits the packet to signal unit 101. After the retransmission of the packet, the routine illustrated in FIG. 7 is completed and exit is made through block 707.

Returning to decision block 702, if the packet was not a start packet, control is passed to decision block 708 which determines whether the packet was a power packet. If the packet is a power packet, then control is passed to block 709. The latter block calculates what the sensitivity of the optical receiver should be by using the power level which was contained within the power packet and the stored identification information from the start packet defining the attenuation of the various optical components in the optical path from the receiver to the optical transmitter. Control is then passed to block 710 which sends the necessary information to the optical receiver to adjust its sensitivity. Then an exit is made via block 707.

Returning to decision block 708, if the packet was not a power packet, then control is passed to block 711 which performs the functions requested within the received packet and an exit is made via block 707.

Figure 8:
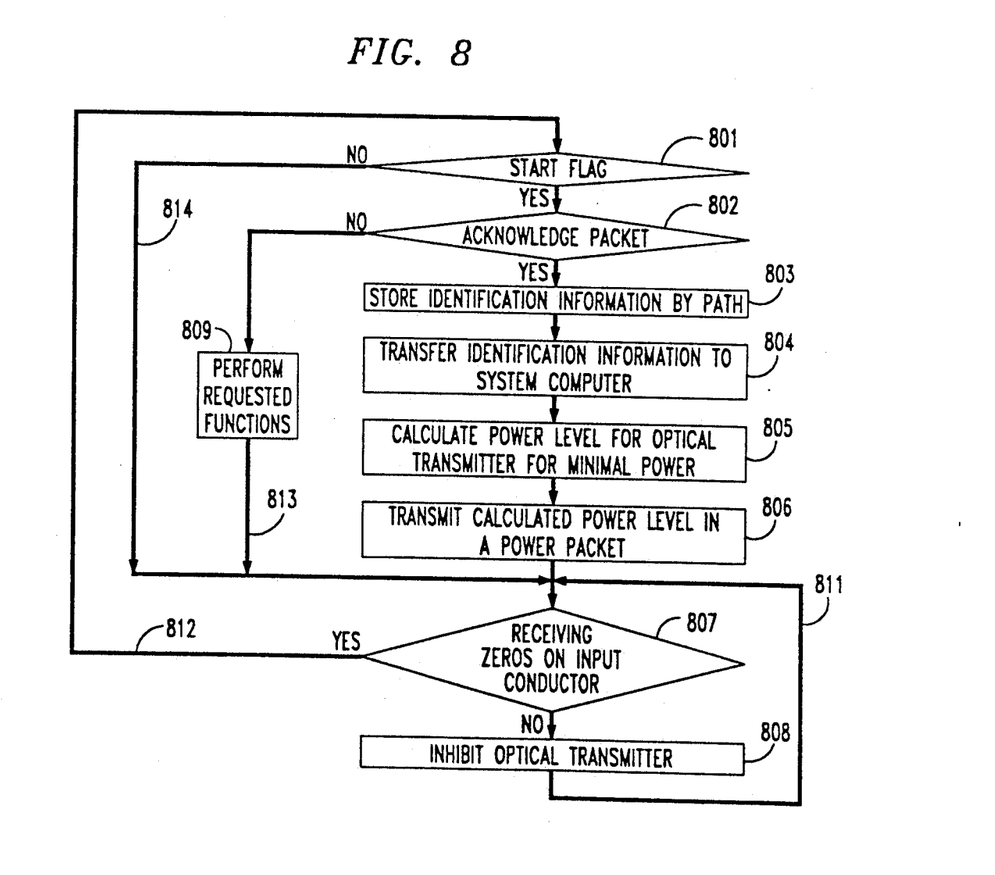
FIG. 8 illustrates, in flow chart form, the operation of an optical transmitter.

FIG. 8 illustrates, in flowchart form, a program routine executed by signal unit 101 which may be a self-contained microcomputer. Unit 101 is continuously testing data signals received on conductor 116 to assure that either a packet is being received or that all zeroes are being received. When a start flag is detected by decision block 801, control is transferred to decision block 802 which tests the header of the flag to determine if it is an acknowledge packet. If it is an acknowledge packet, control is passed to 803 which stores the identification information within the acknowledge packet by path. Next, decision block 804 is executed which transfers the identification information to system computer 131. Then, block 805 calculates the power level required from optical transmitter 102 so that optical transmitter 102 is putting out the minimum power and yet sufficient for the sensitivity range of the optical receiver whose path has the greater attenuation. Next, block 806 forms a power packet comprising the calculated power level and transmits this power packet on conductor 117. After the transmission of the power packet, unit 101 by execution of decision block 807 determines whether all zeroes are still being received on input connector 116. If all zeroes are not being received nor any packet data, block 808 is executed and optical transmitter 102 is inhibited from transmitting optical power and control is transferred back to decision block 807 via path 811. If data is being received on input conductor 117, control is transferred back to decision block 801 via path 812.

Returning to decision block 801. If a start flag is not detected, control is passed to decision block 807 via path 814. If a start flag is detected and decision block 802 determines that it is not an acknowledge packet, control is passed to block 809 which performs the requested functions by the packet. After execution of block 809, control is passed to decision block 807 via path 813.

Figure 9:
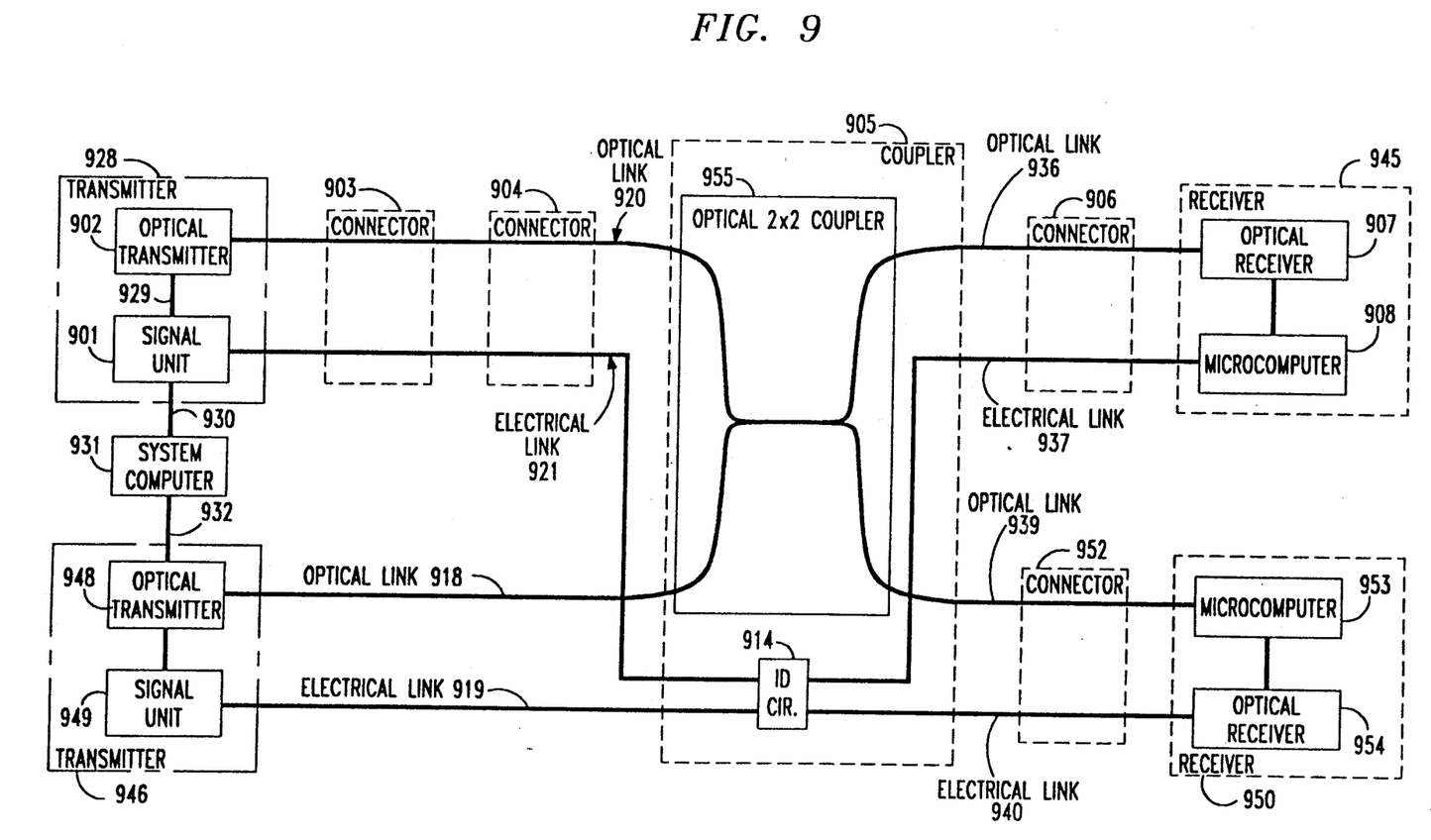
FIG. 9 illustrates another embodiment in accordance with the invention.

FIG. 9 illustrates a system where either transmitter 928 or transmitter 946 is transmitting optical and electrical information to receivers 945 and 950. Only one of the transmitters is transmitting information at any given time. System computer 931 determines which of the transmitters is transmitting information to the receivers. Connectors 903, 904, 906, and 952 and receivers 945 and 950 function in a similar manner as described for corresponding elements in FIG. 1. Transmitter 928 transmits optical signals on optical link 920 and electrical signals on electrical link 921; and transmitter 946 transmits electrical signals on optical link 918 and electrical signals on electrical link 919. Coupler 905 is responsive to both optical and electrical signals being received on the optical and electrical links to communicate these signals to receivers 945 and 950. Optical 2×2 coupler 955 is responsive to optical signals on optical links 920 or 918 to transfer these optical signals to both optical links 936 and 939. Only one transmitter (active) is transmitting at a time and the other transmitter is utilized as the standby transmitter. Because of the difference in the attenuation and delay of the optical links between the optical transmitters and the optical receivers, optical transmitters 902 and 948 must transmit at different optical power output levels. In many applications, it is necessary for the standby optical transmitter to commence transmitting optical signals to the optical receivers without the optical receivers having time to adjust for the difference in output levels. To accomplish such an operation, signal units 901 and 949 individually determine the transmission characteristics of the various optical components in each of the paths to the optical receivers in a manner similar to that performed by signal unit 101 of FIG. 1. This determination of transmission characteristics by the signal units is controlled by system computer 931 which signals to the appropriate signal unit when that signal unit is to perform the identification of the transmission characteristics. The transmission characteristics of both paths interconnecting the transmitters with the receivers is communicated to system computer 931. In response to these characteristics, system computer 931 determines the power levels for each transmitter such that each optical receiver can be adjusted to one sensitivity which will allow the communication of optical signals from either transmitter. In addition, system computer 931 transmits an individual sensitivity adjustment to each receiver via the signal unit in the active transmitter.

Figure 10:
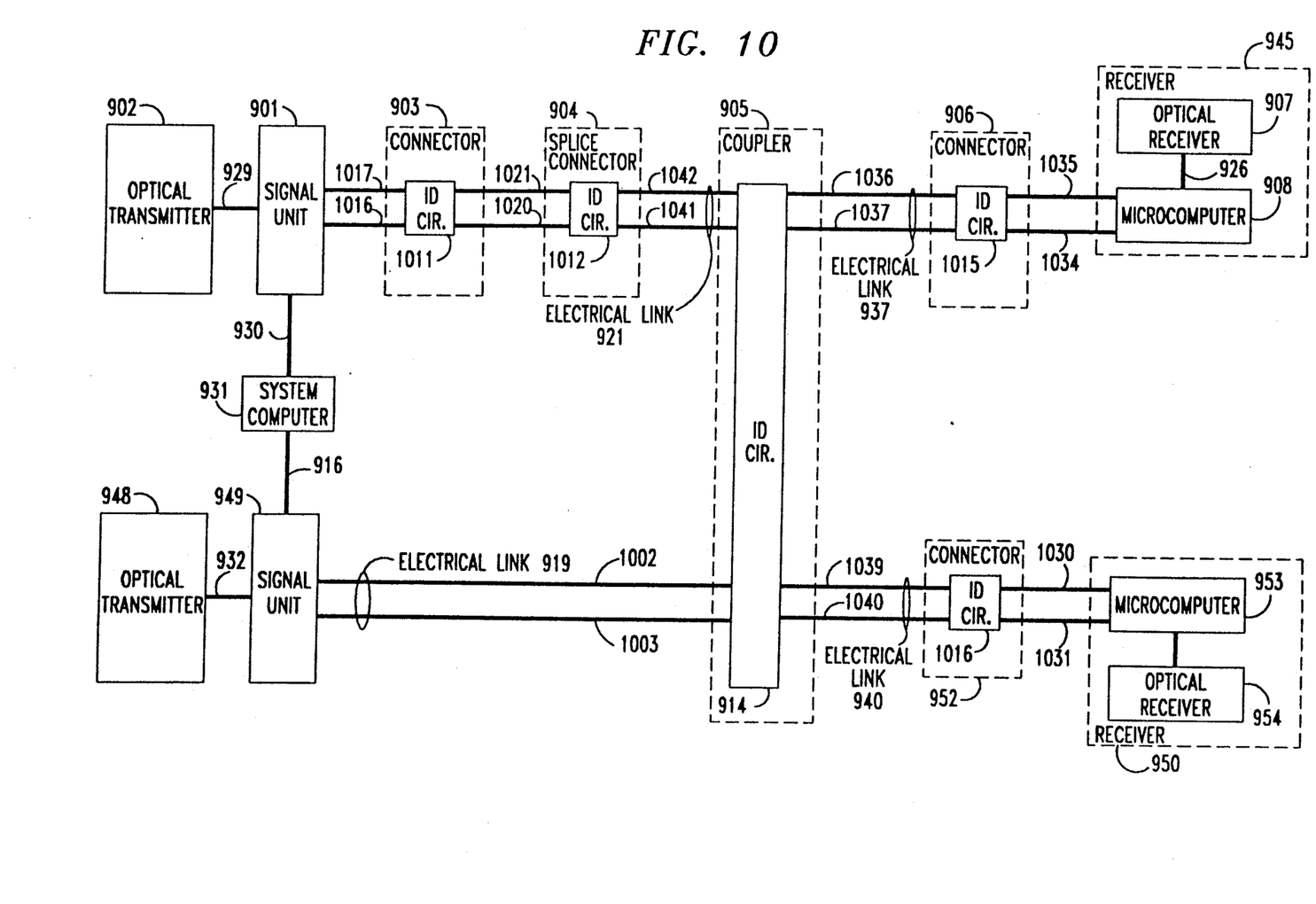
FIG. 10 illustrates the electrical schematic of the embodiment illustrated in FIG. 9.

FIG. 10 illustrates an electrical schematic for the system of FIG. 9. Identification circuits 1011, 1012, 1015, and 1016 function in the same manner as described for the corresponding identification circuits of FIG. 2. However, identification circuit 914 functions in the following manner. Identification circuit 914 is responsive to a packet received either on conductor 1042 or conductor 1002 to add the performance characteristics of coupler 905 to that packet and to retransmit that packet on conductors 1036 and 1039. Microcomputers 908 and 953 are responsive to packets received on conductors 1035 and 1030, respectively, to perform the functions previously described for microcomputers 108 and 202 of FIG. 2. Microcomputers 908 and 953, each, retransmit an acknowledge packet on conductors 1034 and 1031, respectively.

Identification circuit 914 is responsive to these acknowledge packets received on conductors 1037 and 1040 to process these packets as previously described for identification circuit 114 of FIG. 2 and to retransmit acknowledge packets containing the processed information to signal units 901 and 949 via conductors 1041 and 1003, respectively.

Signal units 901 and 949 are responsive to these performance characteristics to transmit these characteristics to system computer 931 via cables 930 and 916, respectively. System computer 931 determines the optical output power level for each optical transmitter such that each optical transmitter is transmitting at the minimum power and such at that the optical receivers do not have to change sensitivity to receive from either optical transmitter. System computer 931 determines the sensitivity adjustment required for each of the optical receivers. Assuming that optical transmitter 902 is the active transmitter and that optical transmitter 948 is the standby transmitter, system computer 931 transmits to signal unit 949 the power output level of optical transmitter 948 via cable 916. Signal unit 949 is responsive to this information to adjust optical transmitter 948 via cable 932. System computer 931 transmits to signal unit 901 the power output level of optical transmitter 902 and the sensitivity adjustments for optical receiver 907 and 954. Signal unit 901 is responsive to the power output level information to adjust optical transmitter 902 via cable 929. Also, signal unit 901 is responsive to the receiver sensitivity adjustment information to form a sensitivity packet and to transmit this sensitivity packet to microcomputer 908 and 953 via the links, connectors, and coupler illustrated in FIG. 10. The sensitivity packet contains the sensitivity adjustments for both receivers and defines which sensitivity adjustment is to be used by a particular receiver. Microcomputers 908 and 953 are responsive to the sensitivity information for their corresponding optical receiver within the sensitivity packet to adjust the sensitivity of the corresponding optical receiver.

Figure 11:
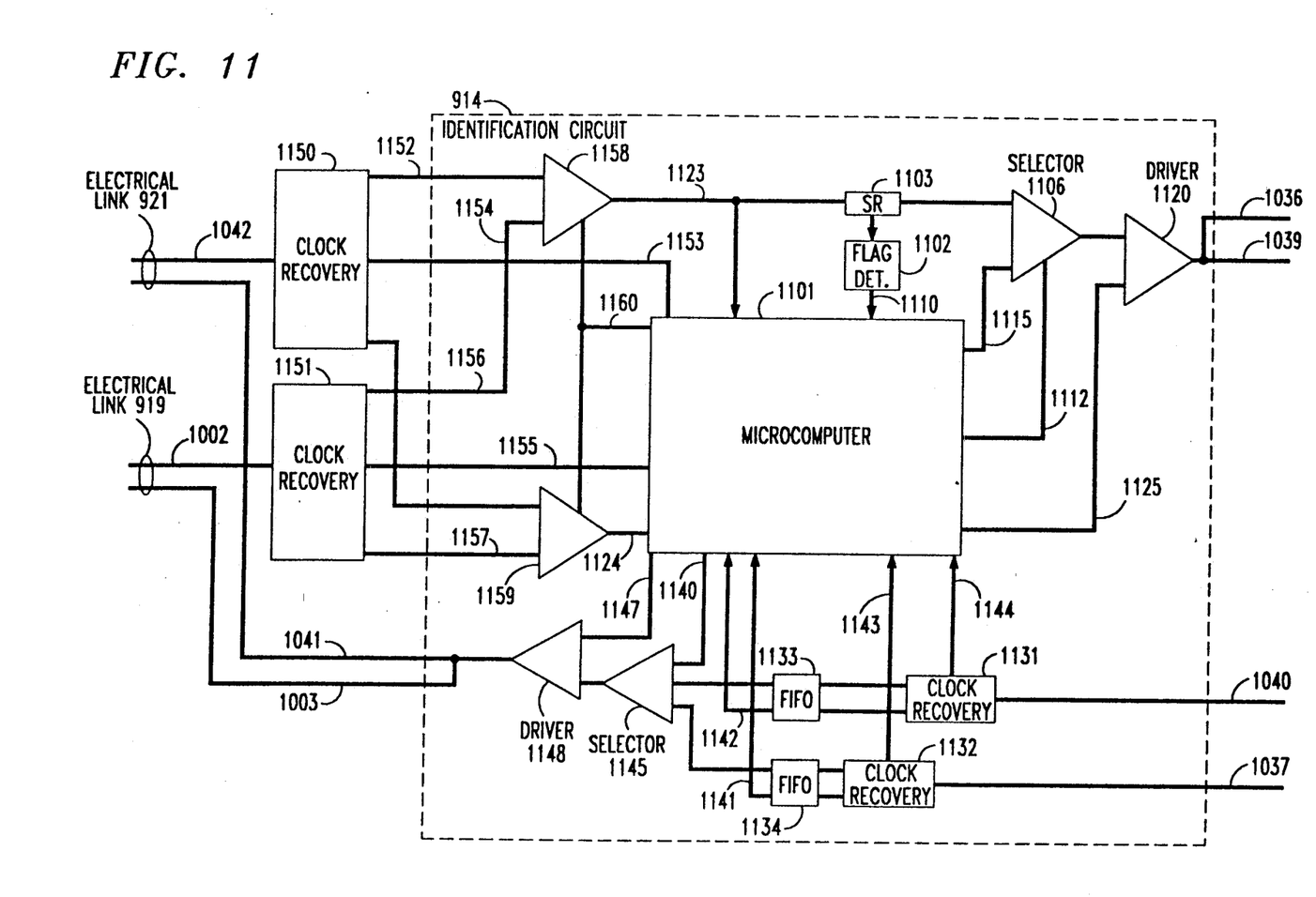
FIG. 11 illustrates, in greater detail, an identification circuit for utilization with the embodiment illustrated in FIG. 9.

Identification circuit 914 is illustrated in greater detail in FIG. 11. Elements 1101 through 1148 function in the same manner as previously described for identification circuit 114 with respect to FIG. 3. Clock recovery circuits 1150 and 1151 function in the following manner. Clock recovery circuit 1150 is responsive to non-zero data to signal microcomputer 1101 via conductor 1153. Microcomputer 1101 is responsive to this signal to transmit control information via cable 1160 to data selectors 1158 and 1159 so that these selectors select the data and clock signals from clock recovery 1150. The remaining elements of identification circuit 914 then processes the clock and data information from clock recovery circuit 1150 in the same manner as previously was described for identification circuit 114 in FIG. 3 in response to clock and data signals from clock recovery circuit 322. Microprocessor 1101 functions in a similar manner with respect to clock recovery circuit 1151 and conductors 1155 through 1157.

It is understood that the above-described embodiment is merely illustrative of the principals of the invention and that other arrangements may be devised by those skilled in the art without departing from the spirit and scope of the invention. In particular, those skilled in the art could readily envision a method that would have the signal unit of the active transmitter to assume the functions of system computer.

I claim:

1. An apparatus for adjusting optical transmitting means and optical receiving means interconnected by an optical communication means, comprising:

an electrical communication means corresponding to the optical communication means;

electrical transmitting means associated with the optical transmitting means for transmitting an initial packet on the electrical communication means;

means connected to the electrical communication means and responsive to the initial packet for modifying the initial packet to insert characteristics of the optical communication means into the initial packet;

electrical receiving means associated with the optical receiving means for receiving the modified initial packet, for storing the characteristics, and for retransmitting the modified packet to the electrical transmitting means;

the electrical transmitting means responsive to the retransmitted packet for calculating an adjustment to adjust the optical transmitting means and for transmitting the adjustment in an adjustment packet to the electrical receiving means via the electrical communication means; and the electrical receiving means responsive to the adjustment in the transmitted adjustment packet and to the stored characteristics for adjusting the sensitivity of the optical receiving means.

2. The apparatus of claim 1 wherein the optical communication means comprises a plurality of optical components and the modifying means comprises a plurality identification units and each identification unit corresponds to one of the optical component; and each identification unit responsive to the initial packet for inserting the characteristics of corresponding optical component into the initial packet.

3. The apparatus of claim 2 wherein wherein the optical communication means having a plurality of optical paths formed by the optical components and the electrical communication means having a plurality of electrical paths with each optical path having a corresponding electrical path.

4. The apparatus of claim 3 wherein a subset of the optical paths share some of the optical components.

5. The apparatus of claim 3 wherein the electrical receiving means comprises a plurality of electrical receivers and each electrical receiver terminates one of the electrical paths; and the optical receiving means comprises a plurality of optical receivers and each optical receiver terminates one of the optical paths and each electrical receiver is associated with an individual optical receiver.

6. The apparatus of claim 5 where each electrical receiver is responsive to the adjustment in the adjustment packet and to the characteristics of optical components forming the optical path corresponding to the electrical path to which each electrical receiver is connected, for adjusting the sensitivity of the associated optical receiver.

7. The apparatus of claim 5 wherein each electrical receiver transmits a continuous electrical signal to the electrical transmitting means on the electrical path connected to each electrical receiver when not retransmitting a packet;

one of the identification unit connected to a subset of the electrical paths and is responsive to continuous electrical signals on all of the electrical paths of the subset for transmitting a continuous signal towards the electrical transmitting means; and the electrical transmitting means is responsive to the absence of packets and continuous electrical signals on all of the electrical paths connected to the electrical transmitting means to disable the optical transmitter.

8. The apparatus of claim 5 wherein the electrical transmitting means comprises a plurality of electrical transmitters and each electrical transmitter terminates one of the electrical paths connected to the electrical transmitting means; and the optical transmitting means comprises a plurality of optical transmitters and each optical transmitter terminates one of the optical paths connected to the optical transmitting means and each electrical transmitter is associated with an individual optical transmitter.

9. An apparatus for adjusting an optical transmitter and a plurality of optical receivers with the optical transmitter being connected to the plurality of optical receivers by a plurality of optical paths and each of the plurality of optical paths having a plurality of optical components, comprising:

a plurality of electrical paths with each electrical path corresponding to one of the plurality of optical paths;

electrical transmitting means associated with the optical transmitter for transmitting packets on the connected electrical path;

a plurality of electrical receivers for receiving packets transmitted on the electrical paths with each electrical receiver associated with an individual one of the optical receivers and connected to an electrical path corresponding to the optical path connected to the individual one of the optical receivers;

a plurality of identification units with each identification unit corresponding to an optical component in the optical path corresponding to electrical path to which the identification unit is connected;

each identification unit is responsive to a packet of a first type from the electrical transmitting means for inserting information into the packet to identify characteristics of the corresponding optical component;

each electrical receiver is responsive to a packet of the first type for storing the characteristics of optical components and for forming a packet of a second type comprising the characteristics of the optical components and transmitting the formed packet of the second type to the electrical transmitting means via the connected electrical path;

the electrical transmitting means is responsive to received packets of the second type for calculating adjustment signal to adjust the optical transmitter based on the characteristics of the optical components, for adjusting the optical transmitter, and for transmitting the adjustment signals in a packet of a third type to the electrical receivers via the electrical paths; and each electrical receiver is responsive to a packet of the third type and the stored characteristics for adjusting the associated optical receiver.

10. The apparatus of claim 9 where electrical transmitting means adjusts the optical transmitter for a minimal optical output which still permits communication with all of the optical receivers.

11. The apparatus of claim 9 wherein
each electrical receiver transmits continuous signals to the electrical transmitting means on the connected electrical path when not transmitting a packet;
one of the identification units connected to a subset of the electrical paths and in response to continuous signals on all of the electrical paths of the subset transmits continuous signals towards the electrical transmitting means; and
the electrical transmitting means in response to the absence of packets and continuous signals on connected electrical paths disables the optical transmitter.

12. An apparatus for adjusting a plurality of optical transmitters and a plurality of optical receivers with the optical transmitter being connected to the plurality of optical receivers by a plurality of optical paths, and each of the plurality of optical paths having a plurality of optical components, comprising:
a system computer;
a plurality of electrical paths with each electrical path corresponding to one of the plurality of optical paths;
a plurality of electrical transmitters each connected to an electrical path and associated with an optical transmitter for transmitting packets on the connected electrical path;
a plurality of electrical receivers for receiving packets transmitted on the electrical paths with each electrical receiver associated with an individual one of the optical receivers and connected to an electrical path corresponding to the optical path of the associated optical receiver;
a plurality of identification units with each identification unit associated to an optical component in the optical path corresponding to electrical path to which the identification unit is connected;
each identification unit is responsive to a packet of a first type for inserting information into the packet to identify characteristics of the associated optical component;
each electrical receiver is responsive to a packet of the first type for forming a packet of a second type comprising the characteristics of the optical components and transmitting the formed packet of the second type via the connected electrical path;
each electrical transmitter is responsive to packets of the second type received from the connected electrical path for communicating the characteristics to the system computer;
the system computer is responsive to the characteristics of all optical paths interconnecting the optical transmitters to the optical receivers for calculating the adjustment to be made to each optical transmitter, for transmitting the adjustment to the associated electrical transmitter of each optical transmitter, for calculating the adjustment for each optical receiver whereby the adjustment remains approximately the same regardless of which optical transmitter is transmitting, and for transmitting the adjustments for the optical receivers to a selected one of the electrical transmitters;
each electrical transmitter is responsive to the adjustment for the associated optical transmitter for adjusting the associated optical transmitter;
the selected one of the electrical transmitters is responsive to the adjustments for the optical receivers for forming the adjustments for the optical receivers into a packet of a third type and transmitting the packet of the third type to the electrical receivers via the electrical paths; and
each electrical receiver is responsive to the packet of the third type for adjusting the associated optical receiver using the adjustment for the associated optical receiver from the packet of the third type.

13. The apparatus of claim 12 where the system computer adjusts the optical transmitters for a minimal optical output which still permits communication with all of the optical receivers.

14. The apparatus of claim 13 where only one of the optical transmitters is actively transmitting at any given time and the selected one of the electrical transmitters is associated with the actively transmitting optical transmitter.

15. A method for adjusting an optical transmitter and a plurality of optical receivers with the optical transmitter being connected to the plurality of optical receivers by a plurality of optical paths and each of the plurality of optical paths having a plurality of optical components, and a plurality of electrical paths with each electrical path corresponding to one of the plurality of optical paths, and an electrical transmitter associated with the optical transmitter, and a plurality of electrical receivers with each electrical receiver associated with an individual one of the optical receivers and connected to an electrical path corresponding to the optical path of the individual one of the optical receivers, and a plurality of identification units with each identification unit associated to an optical component in the optical path corresponding to electrical path to which the identification unit is connected, the method comprising the steps of:
transmitting initial signals via connected electrical paths by the electrical transmitter;
inserting by each identification unit in response to the initial signals information into the initial signals to identify characteristics of the associated optical component;
storing the characteristics of optical components, forming acknowledge signals comprising the characteristics of the optical components, and transmitting the acknowledge signals to the electrical transmitter via the connected electrical path by each electrical receiver in response to the inserted signals;
calculating by the electrical transmitter in response to received acknowledge signals the adjustment to be made to the optical transmitter based on the characteristics of the optical components, adjusting the optical transmitter, and transmitting the adjustment as adjustment signals to the electrical receivers via the electrical paths; and
adjusting the associated optical receiver by each electrical receiver in response to the adjustment signals and the stored characteristics.

16. The method of claim 15 wherein the optical transmitter is adjusted for a minimal optical output which still permits communication with all of the optical receivers.

17. The method of claim 15 further comprises the steps of transmitting continuous signals by each electrical receiver to the electrical transmitter on the connected electrical path when not transmitting other signals;

transmitting continuous signals by one of the identification unit connected to a subset of the electrical paths towards the electrical transmitter in response to continuous signals on all of the subset of the electrical paths; and disabling the optical transmitter by the electrical transmitter in response to the absence of continuous signals and other signals on the connected electrical paths.

* * * * *